United States Patent [19]
Yankowski et al.

[11] 3,941,402
[45] Mar. 2, 1976

[54] ELECTROMAGNETIC SHOCK ABSORBER

[76] Inventors: Anthony P. Yankowski, 117 Brighton Ave., Belleville, N.J. 07109; Arnold Klausner, 151 Luddington Ave., Clifton, N.J. 07011

[22] Filed: Mar. 3, 1975

[21] Appl. No.: 554,461

[52] U.S. Cl. ......... 280/124 R; 104/148 MS; 308/10; 267/182
[51] Int. Cl.² ........................................ B60G 11/00
[58] Field of Search ................ 280/124 R; 267/182; 104/148 MS; 308/10

[56] References Cited
UNITED STATES PATENTS
3,842,753  10/1974  Theodore .................. 105/157 R

*Primary Examiner*—Philip Goodman

[57] ABSTRACT

The present invention discloses an electromagnetic shock absorber which may be employed to prevent the bottoming of springs in autos during shock conditions, or to replace, in its entirety, a shock absorber.

The present shock absorber includes two electro-magnets, the first having a fixed north-to-south field and the second having a field whose polarity is reversible dependant upon the direction of the shock which is to be absorbed or dampened. Where the undesirable shock involves a movement of the car axle toward the auto frame, the polarity of the magnet having a reversible field causes a repulsion between the two electro-magnets. Where the undesirable motion of the car axle is away from the auto frame, the field of the reversible magnet creates an attraction between the two electro-magnets.

Hence, any undesirable motion of the auto axle relative to the auto frame is counteracted by virtue of the present system.

5 Claims, 2 Drawing Figures

ELECTROMAGNETIC SHOCK ABSORBER

BACKGROUND OF THE INVENTION

The present invention relates to a suspension and shock absorbing means for automotive vehicles, inclusive of cars, trucks, and railway rolling stock. More particularly, the present invention relates to an improved damping system for the suspension of any vehicle having both a sprung weight-supporting section, such as the frame of an automobile, and an unsprung surface-contacting portion, such as the axle of an auto.

The prior art has seen various generalized attempts involving the utilization of magnets and electro-magnets in order to serve the purpose of suspension and shock absorption within a mechanical system. For example, see patents to Thall, U.S. Pat. No. 2,973,963 (1961); and Lyman, U.S. Pat. No. 3,243,238 (1966).

One of the more advanced efforts in the field of suspension dampening involving the use of magnetic means appears in the patent to Theodore, U.S. Pat. No. 3,842,753 (1974). Said patent discloses the use of relatively sophisticated electronic circuitry in order to regulate the repulsive forces within a particular electromagnetic shock dampening configuration. As far as is known by the Inventors, the patent to Theodore represents the most pertinent art which has heretofore appeared.

However, said patent differs from the present invention in several areas. Firstly, it utilizes only repulsive electro-magnetic forces, rather than a combination of both repulsive and attractive forces as is disclosed in the hereinafter specification. Further, the patent to Theodore utilizes a relatively involved electronic circuit to achieve its purpose. In distinction, the present invention utilizes a circuit of extreme simplicity which, nonetheless, is wholly adequate in achieving the desired shock absorption function.

SUMMARY OF THE INVENTION

The present invention comprises a first electro-magnetic member having a polarity which is normally in a single northsouth direction. Said first member is proximally disposed to a second electro-magnetic member having a magnetic polarity which reverses as a function of the direction of relative movement of two elements, one sprung and the other unsprung, in an automotive vehicle. Relative movement of said elements either toward or away from each other results in an opposition to the direction of motion and to the momentum of the shock incurred by the unsprung element.

Accordingly, it is an object of the present invention to provide a means for the dampening of oscillations between the sprung and unsprung sections of an automotive vehicle.

It is a further object of the present invention to provide an electro-magnetic shock dampening means having general utility in shock absorbers and suspension systems.

The above and other objects, features and advantages of the invention will become evident from the herinafter set forth description and illustrations.

DETAILED DESCRIPTION OF THE INVENTION

The operation of the present mechanical system, as in all systems involving the suspension of a mass upon a spring, is governed by the following differential equation:

$$m \frac{d^2x}{dt^2} + c \frac{dx}{dt} + kx = F \quad (1)$$

Where:
- $m$ = mass suspended by the spring,
- $c$ = viscous damping provided by the electromagnetic shock absorber,
- $K$ = spring constant
- $F$ = the impulsive force resulting when a vehicle strikes a pothole or protrusion in the road.

The above equation can be rearranged in order to take the following form:

$$\frac{d^2x}{dt^2} + \frac{d}{m} \cdot \frac{dx}{dt} + \frac{k}{m} \cdot x = \frac{F}{m} \quad (2)$$

The solution for this equation is a dampened sinusoid having the following form:

$$x = AE - (c/2m) t ' \sin wt \quad (3)$$

Where:
- $A$ = maximum amplitude of the displacement of the suspended mass, and
- $w$ = the damping frequency of the suspended mass, where $$w = [k/m - (c/2m)^2]1/2 \quad (4)$$

Figure 2:
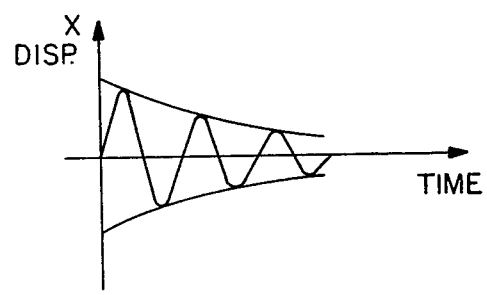
FIG. 2 is a mathematical representation of the solution of a differential equation defining the normal movement of a spring-suspended mass in response to a mechanical shock.

Shown in FIG. 2 is a graphical representation of a typical solution to the above Equation 3.

As may be noted from said figure, the displacement $x$ of the mass m comprises an exponentially damped sinusoid, with the critical aspect of the system response being controlled by the equation:

$$e - (c/2m) t \quad (5)$$

It is to be noted that the viscous damping constant $c$ is, as may be noted from Equation 1, associated with the second derivative of displacement, that is, the velocity imparted by the shock of the impulsive force. In other words, the viscous damping constant represents the primary factor in determining the number of cycles or ocillations required in order to damp out a particular shock. Accordingly, through a proper choice of the viscous damping constant $c$, any oscillation which may become imparted to a system could be essentially damped out within two or less cycles. Such a damping would represent a substantial increase in the efficacy of any shock absorbing system.

In accordance with the above, the hereinafter described invention presents a circuit which will maximize the critical viscous damping factor in order to reduce the imparted velocity and momentum which occur during shock conditions.

Figure 1:
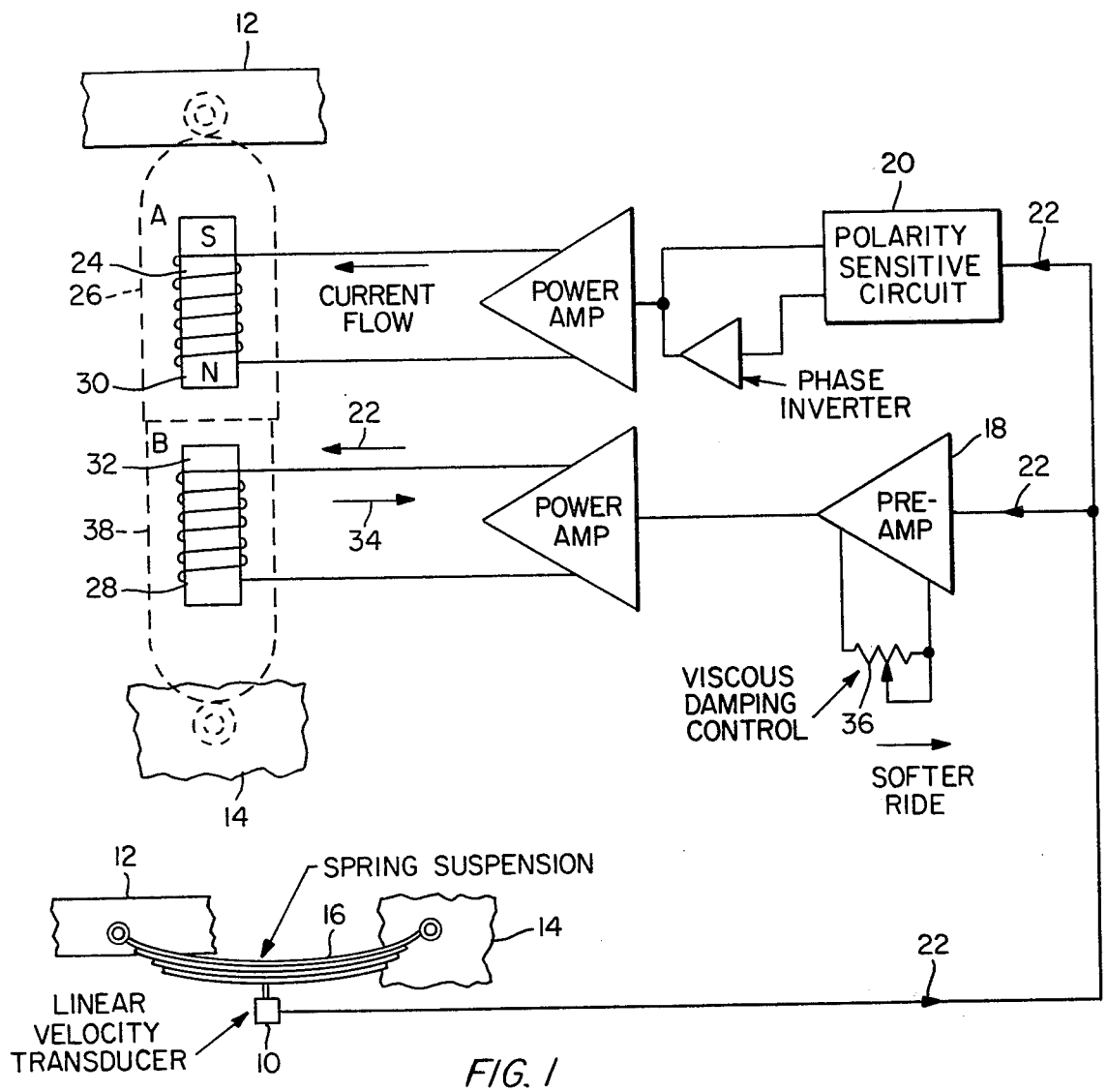
FIG. 1 is a schematic representation of the present invention, inclusive of its associated control circuitry.

Turning now to FIG. 1, it is noted that a linear velocity transducer 10 senses a relative movement between a sprung-element 12 and an unsprung element 14 of a given vehicle. As this occurs an electrical signal proportional to the velocity of compression or expansion within a spring suspension 16 is fed to a preamplifier 18 and to a polarity sensitive circuit 20. The polarity sensitive circuit serves to maintain a current 22 flowing in the same direction through a first electromagnet 24. Resultingly, said first electromagnet 24, which is interiorly disposed within a generalized mechanical shock absorbing system 26 which abuts the sprung element 12 of the mechanical system, is maintained in a fixed magnetic polarity, for example, the south-to-north direction shown in FIG. 1.

The current flowing through a second electromagnet 28 will vary in direction depending upon the direction of mutual movement of said sprung and unsprung elements. For example, the current 22 will flow to the left into said second electromagnet 28 when the sprung element moves away from the unsprung element. Under this condition, the second electromagnet 28 will exhibit the same south-to-north polarity as that which said first electromagnet 24 maintains at all times. Accordingly, the two adjacent poles 30 and 32 of said magnets 24 and 28 will be attracted to each other by a force which is directly proportional to the relative velocity away from each other of the sprung and unsprung elements of a given system. Hence, the greater the velocity with which the spring suspension 16 is expanded, the greater will be the force of magnetic attraction between said elements 30 and 32. Thusly, the imparted momentum of almost any shock incurred by the present system will be almost immediately absorbed or cancelled out.

Conversely, when the sprung element 12 moves toward the unsprung element 14, a current flow 34 will be produced. This is indicated in FIG. 1 as an arrow moving from left to right away from the magnet 28. Under this condition of current flow, the polarity of the second electromagnet will be from north to south, thereby creating a repulsive force between elements 30 and 32. Hence, when the spring suspension experiences a compression, resulting from any undesirable relative movement of the sprung and unsprung elements, a repulsive force between elements 30 and 32 is immediately generated. This force of repulsion is directly proportional to the relative velocity between the sprung and unsprung elements. Thus, as in the case of attraction between elements 30 and 32, any unwanted impulse momentum, as for example may result from the running over by an auto wheel of a stone or other protrusion in the road, can be almost immediately damped out.

It is further noted that through an adjustment of a viscous damping control 36, the magnitude of the currents 22 and 34 flowing through the second electromagnet 28 can be adjusted. Through such adjustment, a desired softer or harder ride can be obtained, depending upon the particular needs of the vehicle involved as, for example, would depend upon the degree of loading of a particular vehicle.

It is to be noted that the present invention may be practiced through the utilization of permanent magnets rather than through the use of electromagnets. Such a usage would permit the damping of shocks of only a single polarity. However, in certain applications, such a capability is all that is required.

It is to be noted that the mechanical casings 26 and 38 of the electromagnets 24 and 28 respectively, represent a conventional spring shock absorber system whose primary function is to dampen out those shock factors associated with the kx factor in the above Equation 1 as well as the pure acceleration factor which, in instances of a particularly sharp or severe shock, can affect the system. Also, the mechanical casings 26 and 38 serve as a limited back-up system to the present invention inasmuch as they are capable of providing a limited degree of viscous damping.

Accordingly, it is seen that the object of obtaining an effective and practical means for the damping of oscillations between the sprung and unsprung section of a vehicle has been efficiently attained by the above described embodiments to the present invention.

While there have been herein shown and described the preferred embodiments of the present invention, it will be understood that the invention may be embodied otherwise than as herein specifically illustrated or described and that within said embodiments certain changes in the detail and construction, and the form and arrangement of the parts may be made without departing from the underlying idea or principles of this invention within the scope of the appended claims.

Having thus described our invention what we claim as new, useful and non-obvious and accordingly secure by Letters Patent of the United States is:

1. An electromagnetic shock absorbing system, intended to maintain the sprung and unsprung elements of a mechanical system at a fixed distance from each other, comprising:

a. a linear velocity transducer medially coupled between said sprung and unsprung elements, said transducer serving to convey A current flow proportional in magnitude to the velocity of relative motion between said sprung and unsprung elements and, further, having a direction of flow which is a function of the direction of relative movement between said sprung and unsprung elements;

b. a first electromagnet having a polarity which, regardless of the direction of its input current from said transducer, is arbitrarily maintained in a single direction, said first electromagnet being longitudinally disposed between said sprung and unsprung elements; and c. a second electromagnet, electrically coupled to the output of said transducer, having a polarity which is directly proportional to the direction of relative movement between said sprung and unsprung elements, said second electromagnet longitudinally disposed between said elements and, further, disposed upon the same longitudinal axis as said first electromagnet, whereby said second electromagnet will, under conditions in which said sprung and unsprung elements are moving apart, experience a direction of current flow about it which will produce an electromagnetic field which will attract the adjacent poles of said first and second electromagnets to each other, and, conversely, under conditions in which said sprung and unsprung elements are moving toward each other will produce an electromagnetic field in which adjacent poles of said first and second electromagnets will repulse each other, thus creating a desired damping and shock absorbing effect within any suspension system into which the present system may be incorporated.

2. The system as recited in claim 1 in which said sprung element comprises the frame of an automotive vehicle and said unsprung element comprises an axle or wheel of an automotive vehicle.

3. The system as recited in claim 1 in which said system further includes a mechanical shock absorbing sub-system within which said first and second electromagnets are encased.

4. The system as recited in claim 1 in which said system further includes a polarity sensitive circuit and a phase inverter interposed between said first electromagnet and said linear velocity transducer, said polarity circuit and phase inverter serving to maintain the polarity of said first electromagnet in an arbitrarily fixed direction.

5. The system as recited in claim 4 in which said system further includes a pre-amplifier connected in parallel with a viscous damping control in which both of said elements are interposed between said second electromagnet and said linear velocity transducer.

* * * * *